US005647673A

United States Patent [19]

Grundke et al.

[11] Patent Number: 5,647,673

[45] Date of Patent: Jul. 15, 1997

[54] PLATE-CYLINDER BEARING ARRANGEMENT

[75] Inventors: Edgar Grundke, Mannheim; Hans-Jürgen Kusch, Neckargemünd, both of Germany

[73] Assignee: Heidelberger Druckmaschinen AG, Heidelberg, Germany

[21] Appl. No.: 543,159

[22] Filed: Oct. 13, 1995

[30] Foreign Application Priority Data

Oct. 13, 1994 [DE] Germany ........................ 44 36 584.5

[51] Int. Cl.[6] ............................................ F16C 23/06

[52] U.S. Cl. ........................ 384/519; 384/247; 384/583; 100/168

[58] Field of Search .............................. 384/247, 256, 384/418, 419, 519, 543, 583, 586, 587; 100/168

[56] References Cited

U.S. PATENT DOCUMENTS

| | | | |
|---|---|---|---|
| 3,343,484 | 9/1967 | Dahlgren | 384/256 X |
| 3,856,462 | 12/1974 | Mueller | 100/168 X |
| 5,257,866 | 11/1993 | Rennerfelt | 384/247 |
| 5,286,119 | 2/1994 | Fischer | 384/583 X |

FOREIGN PATENT DOCUMENTS

| | | |
|---|---|---|
| 2720313 | 1/1978 | Germany . |
| 1531696 | 11/1978 | United Kingdom . |

*Primary Examiner*—Thomas R. Hannon

*Attorney, Agent, or Firm*—Herbert L. Lerner; Laurence A. Greenberg

[57] ABSTRACT

Plate-cylinder bearing arrangement for a printing press having a plate cylinder and a rubber-blanket cylinder mounted on respective shafts, the plate cylinder and its shaft being displaceable, and a side-register adjusting device serving for position correction includes two bearing levers extending in a direction towards ends of the blanket-cylinder shaft for maintaining the plate-cylinder shaft in its axial position, the plate-cylinder shaft being connected at each of its ends through the intermediary of self-aligning bearings to one of the bearing levers, respectively, and the bearing levers being connected to a printing-press housing, through the intermediary of spherical-cup bearings, so as to be swivellable in axial direction of the plate cylinder.

10 Claims, 2 Drawing Sheets

PLATE-CYLINDER BEARING ARRANGEMENT

BACKGROUND OF THE INVENTION

1. Field of the Invention

The invention relates to a plate-cylinder bearing arrangement for a printing press wherein at least one plate cylinder is displaceable with its shaft, and a side-register adjusting device serves for position correction.

In rotary printing presses for multi-color printing, the problem arises that the registers of the different colors must be in agreement with one another. For this purpose, the plate cylinders are aligned precisely with respect to one another, all of the plate cylinders being are adjusted to the axial position and the circumferential position of one of the plate cylinders. The invention relates to a plate-cylinder bearing arrangement by means of which the side register is adjustable or correctable.

Heretofore known from the published German Patent Document DE-OS 27 20 313 is a plate-cylinder bearing arrangement wherein the plate cylinder with its shaft is displaceably supported in a bushing. The side register correction or adjustment is effected by providing a sliding bushing permanently disposed on the plate-cylinder shaft, the sliding bushing being engaged by a swivel lever which is adjustable through the intermediary of a worm-gear drive.

In order to determine the register error or deviation, a specimen print is made initially at the start of a new printing job. The side and circumferential registers are then corrected. Because of the specimen print, however, the printing press is in the "impression on" position. In this position, Schmitz rings or cylinder bearers, which are disposed at the ends of the cylinders, are pressed onto each other with high forces. Correspondingly high forces act upon the shafts of the plate cylinders, and a displacement in the axial direction requires that very high frictional forces in the respective bearings be overcome. This calls for a high expenditure of force for adjustment, as well as expensive and elaborate bearings. Alternatively, it is necessary to move to the "impression off" position in order to adjust or correct the side register. The latter solution, however, results in the loss of valuable time.

SUMMARY OF THE INVENTION

It is accordingly an object of the invention to provide a plate-cylinder bearing arrangement of the type initially mentioned herein wherein the plate cylinder is displaceable with its shaft also in the "impression on" position without any great expenditure of force, so that simple bearings are sufficient.

With the foregoing and other objects in view, there is provided, in accordance with the invention, a plate-cylinder bearing arrangement for a printing press having a plate cylinder and a rubber-blanket cylinder mounted on respective shafts, the plate cylinder and its shaft being displaceable, and a side-register adjusting device serving for position correction, comprising two bearing levers extending in a direction towards ends of the blanket-cylinder shaft for maintaining the plate-cylinder shaft in its axial position, the plate-cylinder shaft being connected at each of its ends through the intermediary of self-aligning bearings to one of the bearing levers, respectively, and the bearing levers being connected to a printing-press housing, through the intermediary of spherical-cup bearings, so as to be swivellable in axial direction of the plate cylinder.

In accordance with another feature of the invention, the shaft of the rubber-blanket cylinder has bearing parts, and the spherical-cup bearings are disposed on links suspended from the bearing parts of the blanket-cylinder shaft.

In accordance with a further feature of the invention, the self-aligning bearings are spherical-cup ball bearings.

In accordance with an added feature of the invention, the plate-cylinder bearing arrangement includes additional bearings for holding the plate-cylinder shaft in the printing-press housing.

In accordance with an additional feature of the invention, the plate-cylinder bearing arrangement includes a pin extending in axial direction from one of the ends of the plate-cylinder shaft, the pin having plane-parallel supporting surface members disposed in radial direction, and an adjustment element engageable in the supporting surface members in a manner that rotary motion is possible between the pin and the adjusting element.

In accordance with yet another feature of the invention, the adjusting element has a threaded pin, a thread member formed with a thread extending axially to the plate-cylinder shaft is permanently connected to the printing-press housing, the threaded pin being threadedly received in the thread member, and an operator-controlling element for rotating the adjusting element.

In accordance with yet a further feature of the invention, the plate-cylinder bearing arrangement includes a transmission system disposed between the adjusting element and the operator-controlling element, the transmission system comprising an axially aligned ring gear disposed on the adjusting element, and a gearwheel operatively connected to the operator-controlling element, the ring gear and the gearwheel being in meshing engagement.

In accordance with yet an added feature of the invention, the operator-controlling element is a rotary knob for manual operation, the rotary knob being connected through the intermediary of a shaft to the gearwheel.

In accordance with yet an additional feature of the invention, the plate-cylinder bearing arrangement includes at least one bearing permanently connected to the printing-press housing for guiding the adjusting element.

In accordance with a concomitant feature of the invention, the plate-cylinder bearing arrangement includes two lock nuts at an end of the pin for zero-play adjustment of a connection permitting rotary motion between the adjusting element and the pin.

Thus, the plate-cylinder shaft is held in its axial position by means of two bearing levers extending in a direction towards the ends of the blanket-cylinder shaft, the plate-cylinder shaft being connected at each of its ends through the intermediary of self-aligning bearings to one of the bearing levers, and the bearing levers being swivellably connected to the printing-press housing.

An advantage of the device according to the invention is that simple self-aligning bearings are adequate therefor, because there is no displacement of the shaft in the bearings. Displacement of the shaft is possible with a very low expenditure of force, which permits the side-register adjusting device to be of a simpler and lower-cost construction. Moreover, the low frictional forces, which have to be overcome during the adjusting motion, result in an increase in the accuracy of the adjusting operation.

It is advantageous for the bearing levers to be connected through the intermediary of spherical-cup bearings to the printing-press housing. The spherical-cup bearings may be disposed directly on the printing-press housing, they may be disposed on bearing parts of the rubber-blanket-cylinder shaft, or they may be disposed on links or couples which are suspended from bearing parts of the blanket-cylinder shaft. The last-mentioned possibility is a very space-saving solution for printing presses which possess such links.

A further reduction of the forces required for side-register adjustment is achieved by providing the self-aligning bearings as spherical-cup ball bearings.

A further development of the invention provides for additional bearings, by means of which the plate-cylinder shaft is held in the printing-press housing. The additional bearings only take up the weight of an inking/dampening unit, and thus do not pit any high frictional forces against a side-register adjustment.

In order to adjust the plate cylinder, the plate-cylinder shaft is provided with a pin extending in axial direction at one of its ends, the pin has supporting-surface members with plane-parallel supporting surfaces, disposed in radial direction, the supporting surface members being engaged by an adjusting element of a side-register adjusting device in a manner that rotary motion is possible between the pin and the adjusting element. The side-register adjusting device may be implemented in various ways. One possibility heretofore known mentioned in the cited art at the introduction hereto.

A further development of the invention, however, provides for a side-register adjusting device which is of simple construction and fully satisfies the requirements with respect to the plate-cylinder bearing arrangement according to the invention. With regard to the construction of the side-register adjusting device, as well as, regarding further advantages, reference is made to the foregoing description of the figures.

Other features which are considered as characteristic for the invention are set forth in the appended claims.

Although the invention is illustrated and described herein as embodied in a plate cylinder bearing arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
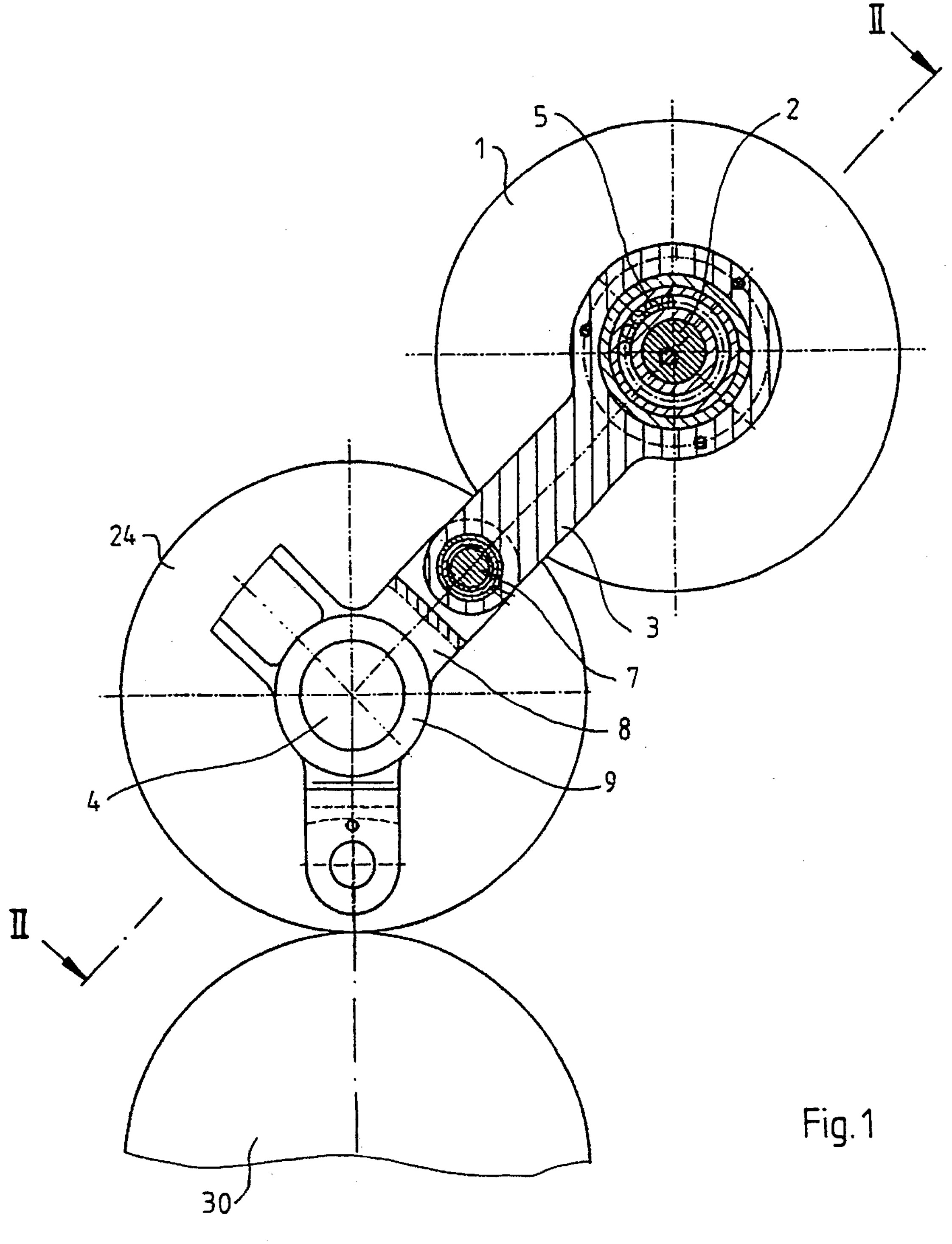
FIG. 1 is an end-face view of the plate, rubber or blanket and impression cylinders of a printing press with a bearing lever extending between the plate and rubber cylinders.

Referring now to the figures of the drawings, there is shown in FIG. 1 the end faces of the cylinders, the side wall of the printing-press housing 6 having been removed in order to expose those end faces. The cylinders include a plate cylinder 1, a rubber-blanket cylinder 24 and an impression cylinder 30. The plate cylinder bears the printing plate and transfers the print image onto the rubber-blanket cylinder 24, which prints a sheet on the impression cylinder 30. The plate-cylinder shaft 2 has a self-aligning bearing 5, which is embraced or surrounded by a bearing lever 3. The bearing lever 3 extends in the direction of the blanket-cylinder shaft 4. The bearing lever 3 has at its end a spherical-cup bearing 7, which is attached to a link or couple 8 which is suspended on bearing parts 9 of the blanket-cylinder shaft 4. The non-illustrated other end of the plate-cylinder shaft 2 is also provided with the aforedescribed arrangement. In this manner, the plate cylinder 1 is held in an easily displaceable manner by two bearing levers 3.

Figure 2:
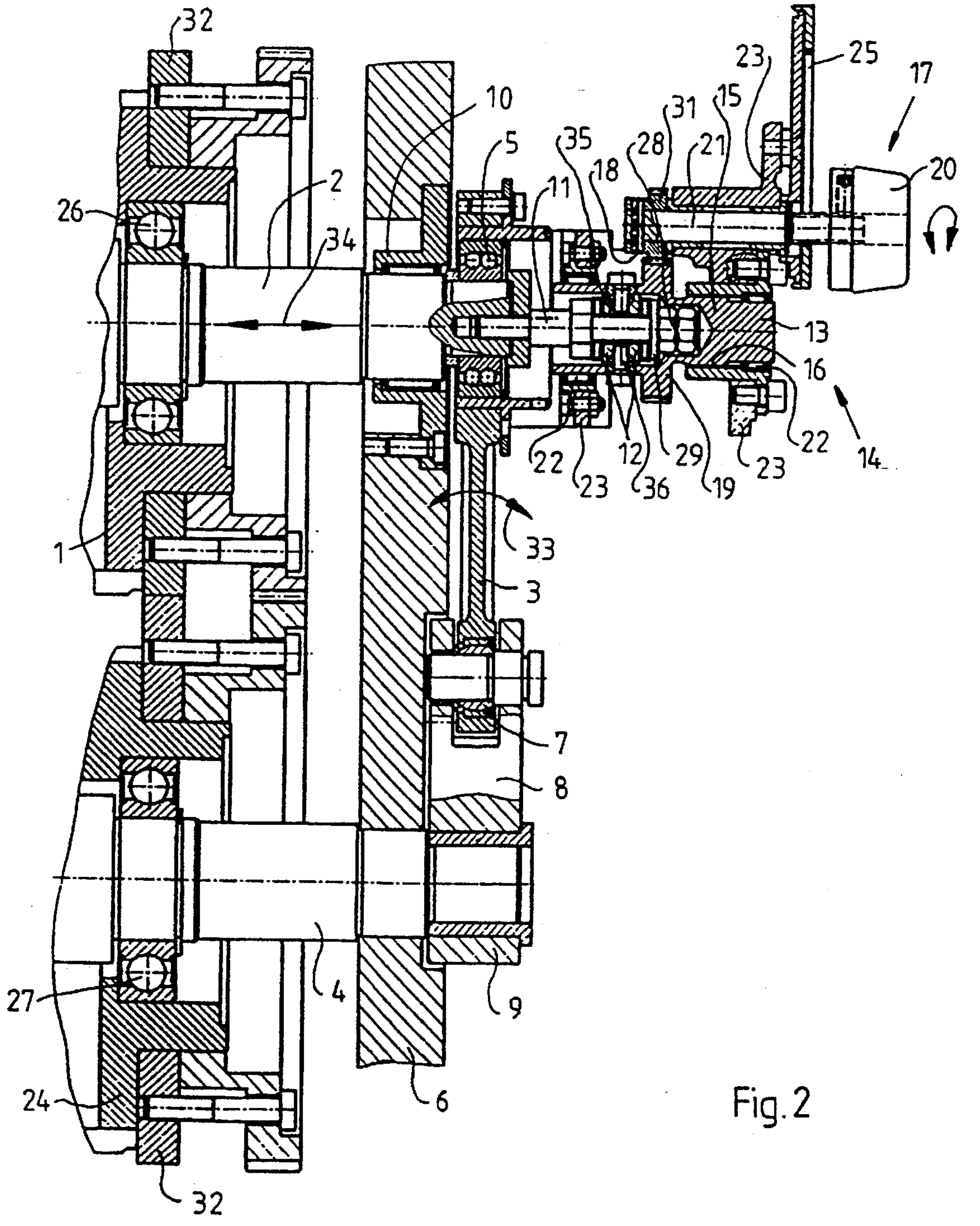
FIG. 2 is a sectional view of FIG. 1 taken along the line B—B in the direction of the arrows, and showing the side-register adjusting device.

FIG. 2 is a sectional view of FIG. 1 taken along the section line B—B. This representation shows the plate cylinder 1 as well as the rubber-blanket cylinder 24 in the manner in which they run on one another with their Schmitz rings or cylinder bearers 32, which results in the aforementioned high radial forces. The plate cylinder 1 rotates on the plate-cylinder shaft 2 by means of bearings 26, and the rubber-blanket cylinder 24 rotates on the rubber-blanket-cylinder shaft 4 by means of bearings 27. The rubber-blanket-cylinder shaft 4 is supported in bearing parts 9 in the printing-press housing 6. The bearing for the plate-cylinder shaft is provided in the aforedescribed manner through the intermediary of the link 8, the spherical-cup bearing 7, the bearing lever 3 and the self-aligning bearing 5. In this embodiment, an additional bearing 10 is provided for the plate-cylinder shaft 2, the additional bearing 10 taking up the weight of a non-illustrated inking/dampening unit. The aforedescribed parts are provided in an identical manner on the other side of the printing press. The curved arrow 33 represents the oscillating motion of the bearing lever 3, and the double-headed arrow 34 represents the axial displacement of the plate-cylinder shaft 2, the plate cylinder 1 being displaced correspondingly during side-register correction.

The plate-cylinder shaft 2 bears at one of its ends a pin 11 which extends the shaft in the axial direction. The pin 11 is provided with radially aligned plane-parallel supporting surface members 12. The supporting surface members 12 are engaged by an adjusting element 13 of a side-register adjusting device 14 in such a manner that a rotary motion is possible between the pin 11 and the adjusting element 13, axial displacements, however, being transmitted with zero play. This connection may, for example, be such that a ring 35 runs between supporting surface members 12 of the pin 11. In order to reduce friction, the supporting surface members 12 may be in the form of axial-thrust bearings. The ring 35 is connected by bolts 36 to the adjusting element 13 which has a threaded pin 15 extending in the axial direction. The threaded pin 15 is held in a thread 16, which is provided in a carrier 23 permanently connected to the printing-press housing 6.

The connection between the adjusting element 13 and the pin 11 enabling the rotary motion is adjustable in a zero-play manner by means of lock nuts 28. The lock nuts 28 are provided at the end of the pin 11. Through appropriate adjustment of the lock nuts 28, they press against washers 29 which move the supporting surface members 12 together in such a manner that the ring 35 of the adjusting element 13 is guided in a zero-play manner.

For additional guidance, the adjusting element 13 has two bearings 22, which are held by the carrier 23. Furthermore, the adjusting element 13 bears an axially aligned ring gear 19, which meshes with a gearwheel 31 mounted on a shaft 21 which is connected to an operator-controlling element 17. The operator-controlling element 17 may be a manual drive or a motor-operated drive, a rotary knob 20 for manual operation having been selected in the illustrated embodiment. The ring gear 19 and the gearwheel 31 form a gear drive 18 which has the required transmission ratio for enabling optimal adjustment. An indicating or display device 25 indicates in which direction and to what extent a correction has been made.

We claim:

1. Plate-cylinder bearing arrangement for a printing press having a plate cylinder and a rubber-blanket cylinder mounted on respective shafts, the plate cylinder and its shaft being displaceable, and a side-register adjusting device serving for position correction, comprising two bearing levers extending in a direction towards ends of the blanket-cylinder shaft for maintaining the plate-cylinder shaft in its axial position, the plate-cylinder shaft being connected at each of its ends through the intermediary of self-aligning bearings to one of the bearing levers, respectively, and the bearing levers being connected to a printing-press housing, through the intermediary of spherical-cup bearings, so as to be swivellable in axial direction of the plate cylinder.

2. Plate-cylinder bearing arrangement according to claim 1, wherein the shaft of the rubber-blanket cylinder has bearing parts, and said spherical-cup bearings are disposed on links suspended from said bearing parts of the blanket-cylinder shaft.

3. Plate-cylinder bearing arrangement according to claim 1, wherein said self-aligning bearings are spherical-cup ball bearings.

4. Plate-cylinder bearing arrangement according to claim 1, including additional bearings for holding the plate-cylinder shaft in said printing-press housing.

5. Plate-cylinder bearing arrangement according to claim 1, including a pin extending in axial direction from one of the ends of said plate-cylinder shaft, said pin having plane-parallel supporting surface members disposed in radial direction, and an adjustment element engageable in said supporting surface members in a manner that rotary motion is possible between said pin and said adjusting element.

6. Plate-cylinder bearing arrangement according to claim 5, wherein said adjusting element has a threaded pin, and including a thread member formed with a thread extending axially to the plate-cylinder shaft, said thread member being permanently connected to said printing-press housing, said threaded pin being threadedly received in said thread member, and an operator-controlling element for rotating said adjusting element.

7. Plate-cylinder bearing arrangement according to claim 6, including a transmission system disposed between said adjusting element and said operator-controlling element, said transmission system comprising an axially aligned ring gear disposed on said adjusting element, and a gearwheel operatively connected to said operator-controlling element, said ring gear and said gearwheel being in meshing engagement.

8. Plate-cylinder bearing arrangement according to claim 7, wherein said operator-controlling element is a rotary knob for manual operation, said rotary knob being connected through the intermediary of a shaft to said gearwheel.

9. Plate-cylinder bearing arrangement according to claim 5, including at least one bearing permanently connected to said printing-press housing for guiding said adjusting element.

10. Plate-cylinder bearing arrangement according to claim 5, including two lock nuts at an end of said pin for zero-play adjustment of a connection permitting rotary motion between said adjusting element and said pin.

* * * * *